United States Patent
Kauerauf et al.

(10) Patent No.: US 8,990,836 B2
(45) Date of Patent: Mar. 24, 2015

(54) INTEGRATING SOFTWARE SOLUTION UNITS

(75) Inventors: Bernd Kauerauf, Heidelberg (DE); Igor Zhukovets, Mannheim (DE)

(73) Assignee: SAP SE, Walldorf (DE)

( * ) Notice: Subject to any disclaimer, the term of this patent is extended or adjusted under 35 U.S.C. 154(b) by 62 days.

(21) Appl. No.: 13/568,132

(22) Filed: Aug. 7, 2012

(65) Prior Publication Data
US 2014/0047459 A1  Feb. 13, 2014

(51) Int. Cl.
- *G06F 3/00* (2006.01)
- *G06F 9/44* (2006.01)
- *G06F 9/46* (2006.01)
- *G06F 13/00* (2006.01)
- *G06F 9/54* (2006.01)

(52) U.S. Cl.
CPC ................................. *G06F 9/548* (2013.01)
USPC .......................................................... 719/316

(58) Field of Classification Search
None
See application file for complete search history.

(56) References Cited

U.S. PATENT DOCUMENTS

| | | | | |
|---|---|---|---|---|
| 7,480,920 B2* | 1/2009 | Brendle et al. | | 719/320 |
| 2004/0019898 A1* | 1/2004 | Frey et al. | | 719/330 |
| 2008/0162266 A1* | 7/2008 | Griessmann et al. | | 705/10 |
| 2009/0089740 A1* | 4/2009 | Crisman | | 717/106 |
| 2009/0113449 A1* | 4/2009 | Balfe | | 719/314 |

* cited by examiner

*Primary Examiner* — H S Sough
*Assistant Examiner* — William C Wood

(57) ABSTRACT

In one embodiment, a proxy transactional context corresponding to a transactional context of a first software solution unit is generated. Further, a business object of a second software solution unit corresponding to the proxy transactional context is retrieved. Furthermore, the assignment of the retrieved business object to a business object of the first software solution unit is defined and the defined assignment is stored in the proxy data object. The proxy transactional context may be accessed using a remote function call and upon executing the proxy transactional context, the program returns to the transactional context. Thereby, the first software solution unit is integrated with the second software solution unit without disrupting the transactional context of the first software solution unit.

18 Claims, 4 Drawing Sheets

INTEGRATING SOFTWARE SOLUTION UNITS

FIELD

Embodiments generally relate to computer systems and more particularly to methods and systems to integrate software solution units.

BACKGROUND

Business applications can be implemented as software solution units such as an on-premises solution unit, which is installed and associated data is stored on computers in the premises of an organization for executing a business application or as an on-demand solution unit, in which the software and associated data pertaining to the business application are centrally stored on a remote facility. Organizations select on-premise solutions and on-demand solutions for different business applications considering the requirements of the business application, and the pros and cons of the solutions. However, business applications implemented as an on-premise solution unit, such as a supplier lifecycle management (SLC), may require on-demand solution data to significantly improve the efficiency and effectiveness of the supply chains. Therefore, there is an increasing demand for integrating software solution units. In this regard, it may be required to store the data of the one software solution unit in another software solution unit. However, storing the data of the one software solution unit in another disrupts transactional context of the software solution unit at which the data is received, which is impermissible since the data in the transactional context could be altered or lost.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to integrate software solution units are described herein. According to various embodiments, the software solution units can be on-premise solution units and on-demand solution units. The on-demand solution or software as a service (SaaS) is a software unit in which software and associated data pertaining to a business application are centrally stored on a remote facility such as a cloud. The cloud storage is a model of networked online storage where data is stored on multiple virtual servers. On the other hand, the on-premises solution unit is installed and associated data is stored on computers in the premises of a user or organization, rather than at the remote facility. According to one embodiment, the software solution units are integrated without disrupting transactional contexts of the software solution units.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
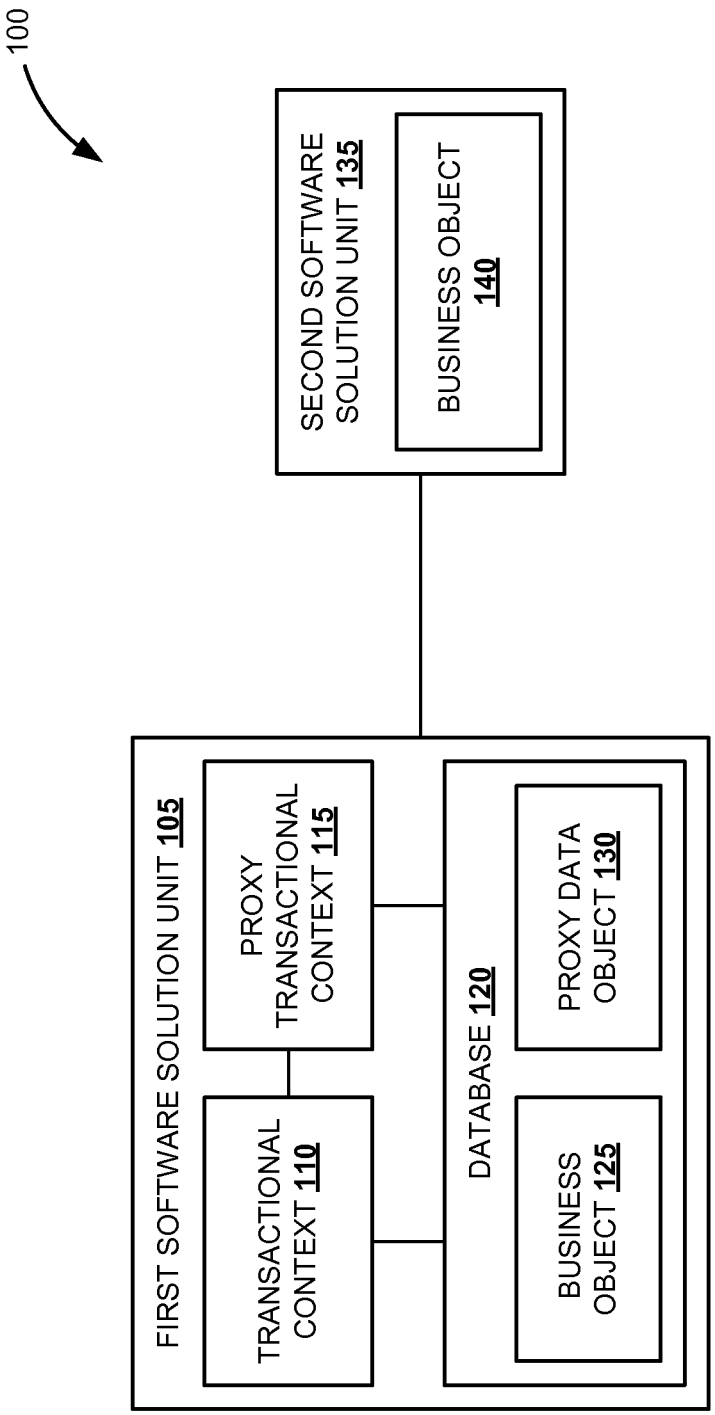
FIG. 1 is a functional block diagram illustrating integration of a first software solution unit with a second software solution unit, according to an embodiment.

FIG. 1 is a functional block diagram 100 illustrating integration of a first software solution unit 105 with a second software solution unit 135, according to an embodiment. The first software solution unit 105 includes a transactional context 110. The transactional context defines a set of operations to be performed on one or more business objects (e.g., a business object 125) by the first software solution unit 105. In other words, the transactional context includes information about change in data, which is involved in a business transaction. The transactional context represents a typical pattern for building applications on a software solution unit. Further, the first software solution unit 105 includes a proxy transactional context 115 corresponding to the transactional context 110. The proxy transactional context 115 includes an assignment to the transactional context 110 including the identities of the one or more business objects (e.g., the business object 125) pertaining to the transactional context 110. Furthermore, the first software solution unit 105 includes a database 120 consisting of the one or more business objects (e.g., the business object 125) and a proxy data object 130 to execute the transactional context 110 and the proxy transactional context 115. Similarly, the second software solution unit 135 includes one or more business objects (e.g., a business object 140) to execute a transactional context associated with the second solution unit 135. In one exemplary embodiment, the first software solution unit 105 can be either of an on-premise solution unit or an on-demand solution unit. The second software solution unit 135 can be either of the on-premise solution unit or the on-demand solution unit.

In one embodiment, the first software solution unit 105 is integrated with the second software solution unit 135 without disrupting the transactional context 110. The proxy transactional context 115 corresponding to the transactional context 110 is generated by a trigger by the transactional context 110. The proxy transactional context 115 is generated in the process of integrating the first software solution unit 105 and the second software solution unit 135 so as to not disrupt the transactional context 110 of the first software solution unit 105. The proxy transactional context 115 serves as a tool to mix up the transactional data of both first software solution unit 105 and the second software solution unit 135 in a non-disruptive way. For example, the proxy transactional context can be generated by creating another server session running in parallel to the main session that the transactional context (e.g., transaction context of first software unit) is processed in. Further, the business object 140 corresponding to a business object 125 associated with the proxy transactional context 115 is retrieved. Furthermore, assignment of the retrieved business object 140 to the business object 125 is defined using the proxy transactional context 115. The defined assignment is stored in the proxy data object 130 to integrate the first software solution unit 105 and the second software solution unit 135.

In one embodiment, the proxy transactional context 115, including details of the defined assignment, may be accessed or called or executed using a technique such as, but not limited to, a remote function call. Further, upon executing the proxy transactional context 115, the program returns to the transactional context 110 of the first software solution unit 105. The transactional context 110 is not altered or lost due to the execution of the proxy transactional context 115 and thereby the transactional context 110 is not disrupted because of the integration of the first software solution unit 105 and the second software solution unit 135.

Figure 2:
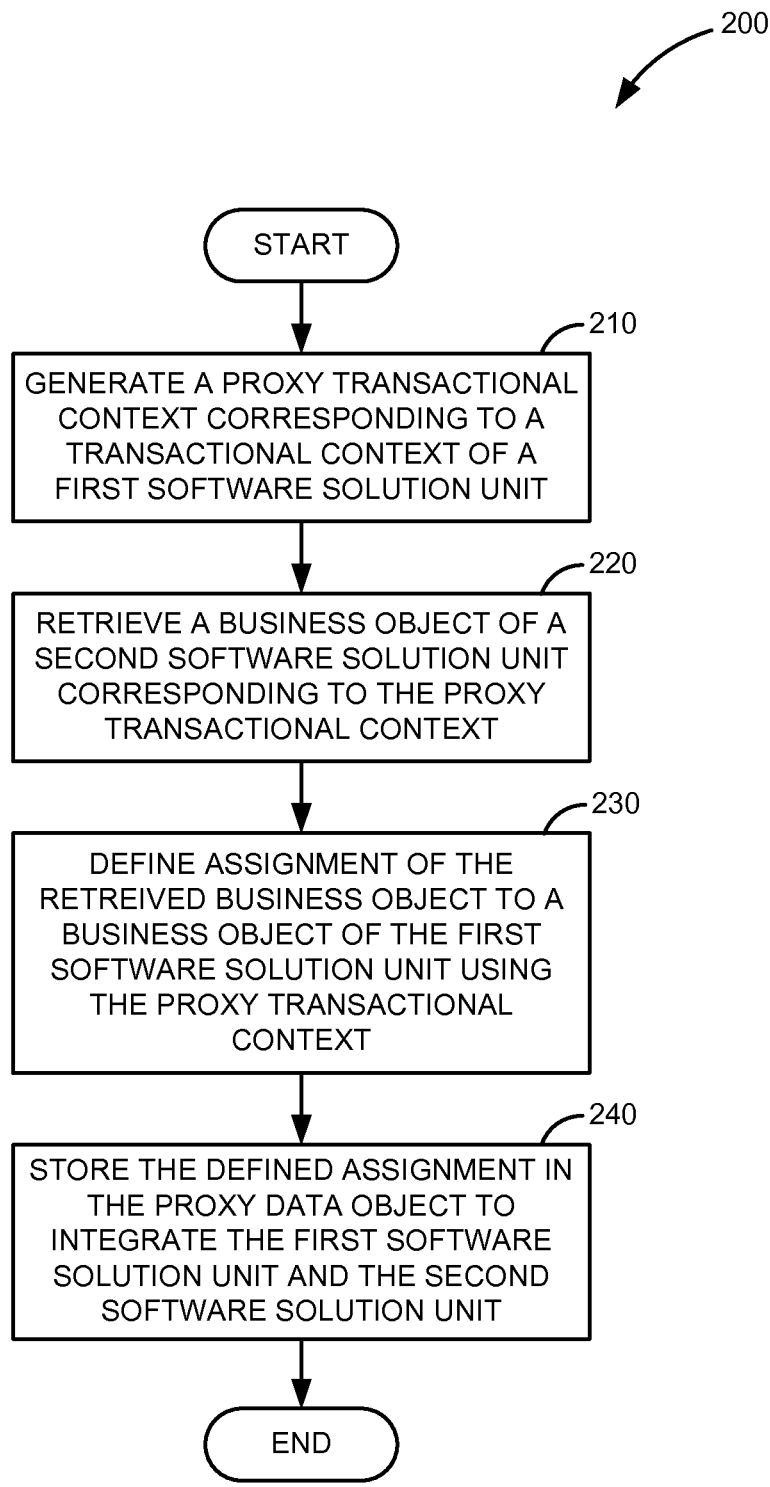
FIG. 2 is a flow diagram illustrating a method to integrate software solution units, according to an embodiment.

FIG. 2 is a flow diagram 200 illustrating a method to integrate software solution units, according to an embodiment. The software solution units can be on-premise solution units and on-demand solution units. For example, a first software solution unit, the on-premise solution unit (e.g., a supplier lifecycle management (SLC)), manages supplier relationship by managing the lifecycle of individual suppliers from onboarding of the supplier to a continuous development with an organization. The supplier may supply a particular service or commodity to the organization. Further, the collaboration of concerned people to maintain the SLC within the organization and with the suppliers external to the organization is an important element in the SLC unit. In order to support collaboration efficiently, the SLC as the on premise solution unit may have to integrate with a business object of a second software solution unit, the on-demand solution unit (e.g., supplier development data unit), to retrieve the updated or latest details of the suppliers (e.g., details of new suppliers in the market, latest reviews on existing suppliers in the market and the like).

At step 210, a proxy transactional context corresponding to a transactional context of the first software solution unit is generated at the first software solution unit. The transactional context includes a plurality of business operations performed on one or more business objects during a business transaction in the first software solution unit. For example, the on-premise transactional context of the SLC unit may include transaction details of the business process such as maintaining supplier data, registering supplier, qualifying supplier, managing supplier portfolio and the like. Considering an example of the on-premise transactional context of maintaining supplier data at the on-premise solution unit, the proxy transactional context corresponding to the transactional context of maintaining supplier data is generated. In one exemplary embodiment, the proxy transactional context is generated when the on-premise transactional context triggers to generate the proxy transactional context.

At step 220, a business object of the second software solution unit corresponding to the proxy transactional context is retrieved. For example, the on-demand business object corresponding to maintaining updated supplier's data (e.g., supplier development business object of the on-demand solution unit) is retrieved at the on-premise solution unit. In one exemplary embodiment, the business object of the second software solution unit is retrieved using one of the techniques such as, but not limited to, a representational state transfer (REST), a simple object access protocol (SOAP), a web services description language (WSDL) and an enterprise service-oriented architecture (ESOA).

At step 230, assignment of the retrieved business object to a business object of the first software solution unit is defined using the proxy transactional context without disrupting the transactional context of the first software solution unit. For example, the supplier development business object (e.g., the on-demand business object including the latest supplier data) is assigned to the on-premise business object associated with maintaining the supplier's data. At step 240, the defined assignment is stored in a proxy data object to integrate the first software solution unit (e.g., on-premise solution unit) with the second software solution unit (e.g., on-demand solution unit). In one exemplary embodiment, the proxy data object resides in the first software solution unit.

In one embodiment, the proxy transactional context may be accessed or called or executed using a technique such as, but not limited to, a remote function call. Since the proxy transactional context is called by the transactional context of the first software solution unit, the proxy transactional context may also be referred to as a slave transactional context and the transactional context of the first software solution unit as a master transactional context. Further, upon executing the proxy transactional context, the program returns to the transactional context of the first software solution unit. The transactional context is not altered or lost due to the execution of the proxy transactional context and thereby the transactional context is not disrupted because of the integration of the first software solution unit and the second software solution unit.

In another exemplary embodiment, if the data of the on-premise solution unit is to be stored in the on-demand solution unit, a proxy transactional context corresponding to the on-demand solution unit is generated and a business object of the on-premise solution unit which is corresponding to a business object of the proxy transactional context is retrieved. Further, the retrieved business object is assigned to the business object of the on-demand solution unit and same is stored in a proxy business object of the on-demand solution unit. In yet another exemplary embodiment, two on-premise software solution units can be integrated using corresponding proxy business objects. Also, in another exemplary embodiment, two on-demand solution units can be integrated using corresponding proxy business objects.

Figure 3:
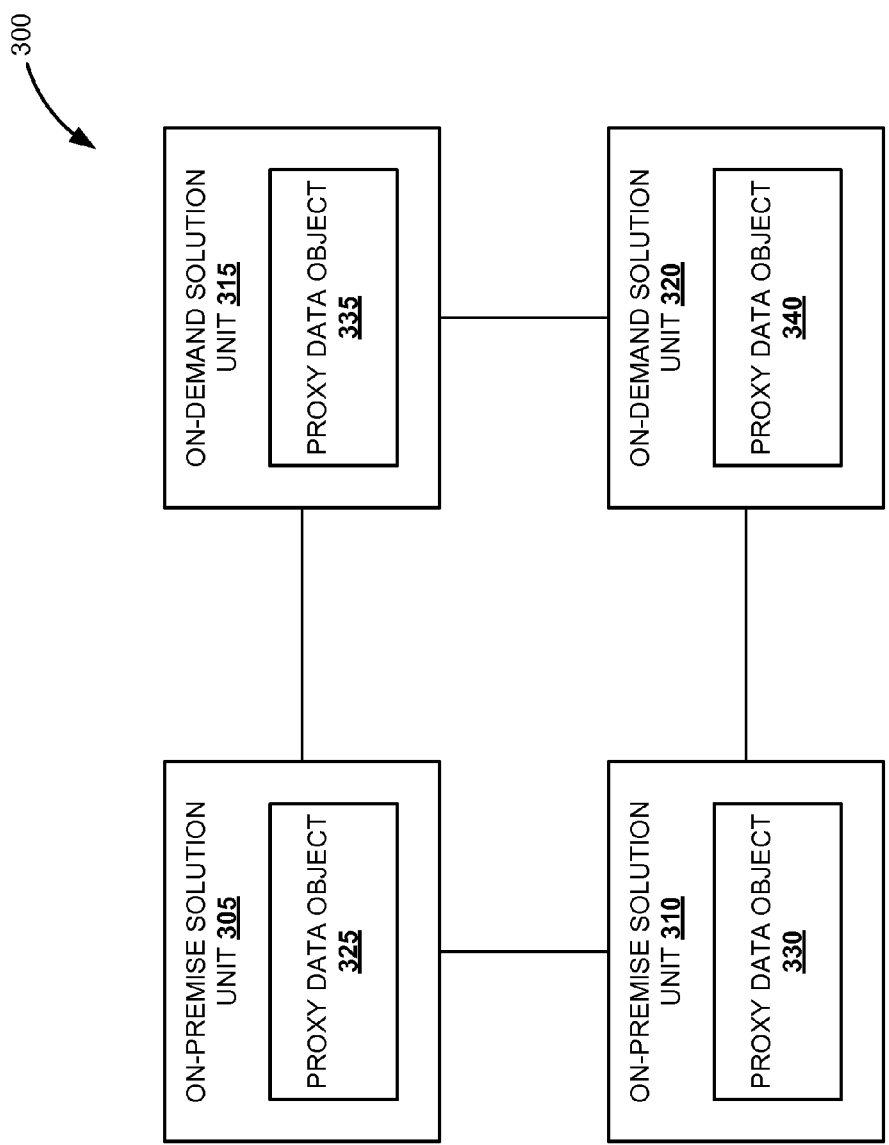
FIG. 3 is a block diagram illustrating integration of software solution units, according to an embodiment.

FIG. 3 is a block diagram 300 illustrating integration of software solution units, according to an embodiment. The software solution units can be on-premise solution units (e.g., 305 and 310) and on-demand solution units (e.g., 315 and 320). In one embodiment, the software solution units (e.g., 305, 310, 315 and 320) are integrated using corresponding proxy data objects (e.g., 325, 330, 335 and 340). For example, the on-premise solution unit 305 can be integrated with the on-demand solution unit 315 using either of the proxy data object 325 or the proxy data object 335 based on which software solution unit receives the data. Further, the on-premise solution unit 305 can be integrated with the on-premise solution unit 310 using either of the proxy data object 325 or the proxy data object 330 based on which software solution unit receives the data. Furthermore, the on-demand solution unit 315 can be integrated with the on-demand solution unit 320 using either of the proxy data object 335 or the proxy data object 340 based on which software solution unit receives the data.

In one exemplary embodiment, the proxy data objects (e.g., 325, 330, 335 and 340) reside in the corresponding software solution units (e.g., 305, 310, 315 and 320). Further, the software solution units (e.g., 305, 310, 315 and 320) include one or more business objects on which a defined set of operations associated with the software solution units (e.g., 305, 310, 315 and 320) are executed. The data transaction between the one or more business objects during the execution of the defined set of operations is known as a transactional context. In other words, the transactional context logically envelops the operations (e.g., business processes) performed on the one or more business objects during a transaction.

For example, considering integration of the on-premise solution unit 305 and the on-demand solution unit 315, a proxy transactional context corresponding to the transactional context of the on-premise solution unit 305 is generated. In one exemplary embodiment, the proxy transactional context includes an assignment to the on-premise transactional context including the identities of the one or more on-premise business objects pertaining to the on-premise transactional context. Further, an on-demand business object of the on-demand solution unit 315 corresponding to the proxy transactional context is retrieved. In other words, the on-demand business object corresponding to the on-premise business object associated with the proxy transactional context is retrieved.

In one embodiment, assignment of the on-demand business object to the on-premise business object is defined using the proxy transactional context without disrupting the on-premise transactional context. In other words, the on-demand solution unit is assigned to the on-premise business object as identified in the proxy transactional context. Further, the proxy transactional context is executed when the proxy transactional context is called and upon executing the proxy transactional context, the execution returns to the on-premise transactional context. The actual on-premise transactional context is not altered or lost due to the execution of the proxy transactional context and thus the on-premise transactional context is not disrupted because of the integration of the on-demand solution unit 315 with the on-premise solution unit 305. In one exemplary embodiment, the defined assignment is stored in the proxy data object 325 to integrate the on-demand solution unit 315 and the on-premise solution unit 305.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 4:
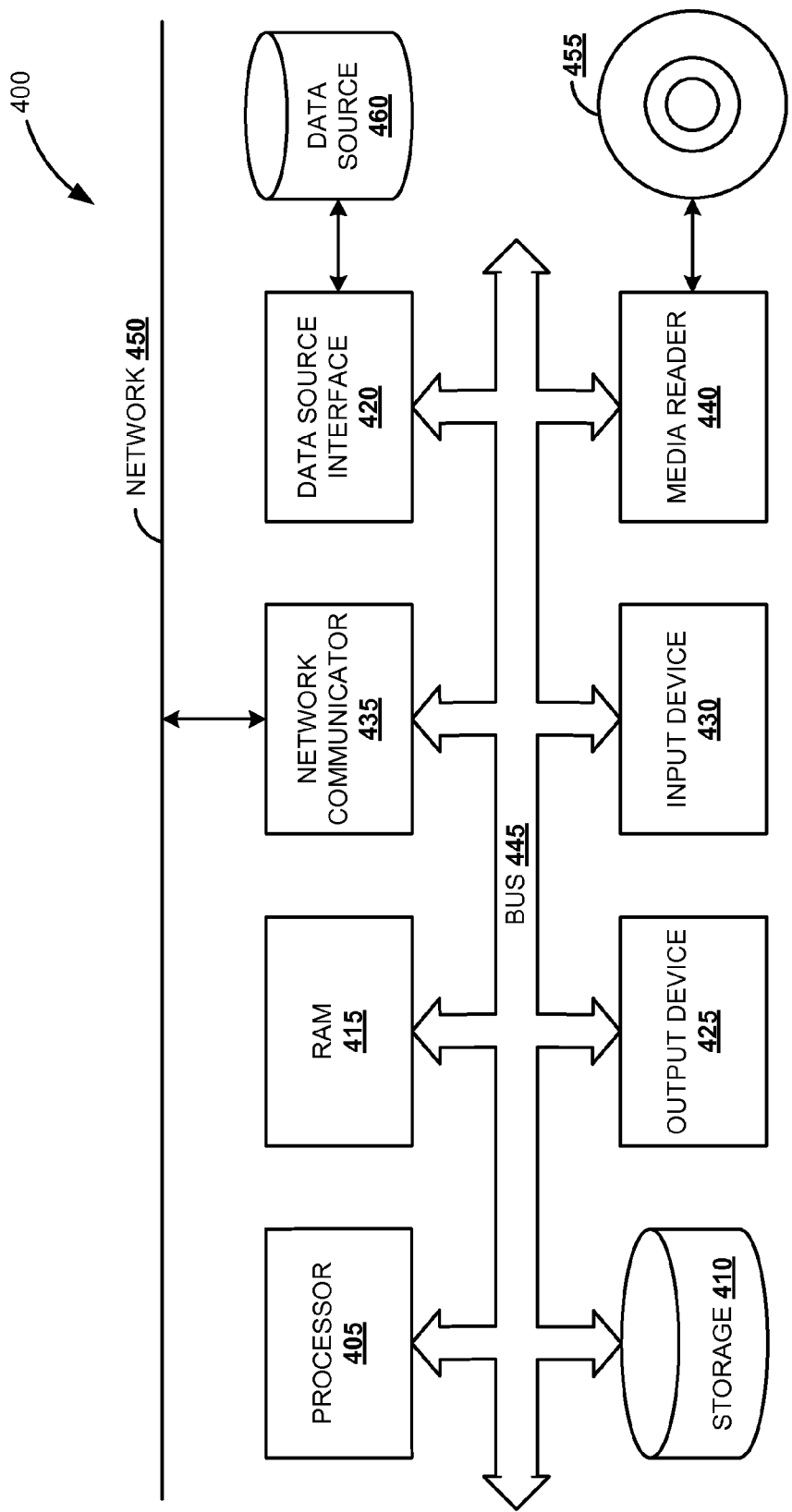
FIG. 4 is a block diagram of an exemplary computer system, according to an embodiment.

FIG. 4 is a block diagram of an exemplary computer system 400, according to an embodiment. The computer system 400 includes a processor 405 that executes software instructions or code stored on a computer readable storage medium 455 to perform the above-illustrated methods. The computer system 400 includes a media reader 440 to read the instructions from the computer readable storage medium 455 and store the instructions in storage 410 or in random access memory (RAM) 415. The storage 410 provides a large space for keeping static data where at least some instructions could be stored for later execution. The stored instructions may be further compiled to generate other representations of the instructions and dynamically stored in the RAM 415. The processor 405 reads instructions from the RAM 415 and performs actions as instructed. According to one embodiment, the computer system 400 further includes an output device 425 (e.g., a display) to provide at least some of the results of the execution as output including, but not limited to, visual information to users and an input device 430 to provide a user or another device with means for entering data and/or otherwise interact with the computer system 400. Each of these output devices 425 and input devices 430 could be joined by one or more additional peripherals to further expand the capabilities of the computer system 400. A network communicator 435 may be provided to connect the computer system 400 to a network 450 and in turn to other devices connected to the network 450 including other clients, servers, data stores, and interfaces, for instance. The modules of the computer system 400 are interconnected via a bus 445. Computer system 400 includes a data source interface 420 to access data source 460. The data source 460 can be accessed via one or more abstraction layers implemented in hardware or software. For example, the data source 460 may be accessed by network 450. In some embodiments the data source 460 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, materials, techniques, etc. In other instances, well-known operations or structures are not shown or described in detail.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
   generate, at a first software solution unit, a proxy transactional context corresponding to a transactional context of the first software solution unit, wherein the proxy transactional context comprises a set of operations and identities of one or more business objects pertaining to the transactional context and the generation of the proxy transactional context creates a server session parallel to a main session processing the transactional context of the first software solution unit;
   retrieve business objects of a second software solution unit corresponding to the proxy transactional context;
   define assignment of the retrieved business objects to the one or more business objects of the proxy transactional context; and
   integrate the first software solution unit and the second software solution unit by executing the proxy transactional context based on the defined assignment stored in a proxy data object.

2. The article of manufacture of claim 1, wherein the proxy transactional context is generated when the transactional context triggers to generate the proxy transactional context.

3. The article of manufacture of claim 1, wherein the transactional context comprises the set of operations performed on the one or more business objects of the first software solution unit during a business transaction.

4. The article of manufacture of claim 1, wherein the proxy transactional context is accessed by a remote function call.

5. The article of manufacture of claim 1, wherein the proxy transactional context comprises the assignment to the transactional context including identities of the one or more business objects associated with the transactional context.

6. The article of manufacture of claim 1, wherein the first software solution unit comprises the proxy data object.

7. The article of manufacture of claim 1, wherein the first software solution unit comprises one of an on-premise solution unit and an on-demand solution unit, and the second software solution unit comprises one of the on-premise solution unit and the on-demand solution unit.

8. A computer implemented method to integrate a first software solution unit with a second software solution unit, the method comprising:
   generating, at the first software solution unit, a proxy transactional context corresponding to a transactional context of the first software solution unit, wherein the proxy transactional context comprises a set of operations and identities of one or more business objects pertaining to the transactional context and the generation of the proxy transactional context creates a server session parallel to a main session processing the transactional context of the first software solution unit;
   retrieving business objects of the second software solution unit corresponding to the proxy transactional context;
   a processor of the computer, defining assignment of the retrieved business objects to the one or more business objects of the proxy transactional context; and
   integrate the first software solution unit and the second software solution unit by executing the proxy transactional context based on the defined assignment stored in a proxy data object.

9. The computer implemented method of claim 8, wherein the proxy transactional context is generated when the transactional context triggers to generate the proxy transactional context.

10. The computer implemented method of claim 8, wherein the transactional context of the first software solution unit comprises the set of operations performed the on one or more business objects of the first software solution unit during a business transaction.

11. The computer implemented method of claim 8, wherein the proxy transactional context is accessed by a remote function call.

12. The computer implemented method of claim 8, wherein the proxy transactional context comprises the assignment to the transactional context including identities of the one or more business objects associated with the transactional context.

13. The computer implemented method of claim 8, wherein the first software solution unit comprises the proxy data object.

14. The computer implemented method of claim 8, wherein the first software solution unit comprises one of an on-premise solution unit and an on-demand solution unit, and the second software solution unit comprises one of the on-premise solution unit and the on-demand solution unit.

15. A computer system to integrate a first software solution unit with a second software solution unit, the computer system comprising:
   at least one processor; and
   one or more memory devices communicative with the at least one processor, wherein the one or more memory devices store instructions to:
      generate, at the first software solution unit, a proxy transactional context corresponding to a transactional context of the first software solution unit, wherein the proxy transactional context comprises a set of operations and identities of one or more business objects pertaining to the transactional context and the generation of the proxy transactional context creates a server session parallel to a main session processing the transactional context of the first software solution unit;

retrieve business objects of the second software solution unit corresponding to the proxy transactional context;

define assignment of the retrieved business objects to the one or more business objects of the proxy transactional context; and integrate the first software solution unit and the second software solution unit by executing the proxy transactional context based on the defined assignment stored in a proxy data object.

16. The computer system of claim 15, wherein the proxy transactional context is generated when the transactional context triggers to generate the proxy transactional context.

17. The computer system of claim 15, wherein the proxy data object is stored in the first software solution unit.

18. The computer system of claim 15, wherein the first software solution unit comprises one of an on-premise solution unit and an on-demand solution unit, and the second software solution unit comprises one of the on-premise solution unit and the on-demand solution unit.

\* \* \* \* \*